United States Patent
Fabrykowski et al.

(10) Patent No.: US 9,110,267 B2
(45) Date of Patent: Aug. 18, 2015

(54) STRAIN RELIEF DEVICE FOR CABLES AND FIBER OPTIC DISTRIBUTION DEVICE

(71) Applicant: CCS Technology Inc., Wilmington (DE)

(72) Inventors: Grzegorz Fabrykowski, Strykow (PL); Michael Muller, Menden (DE)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 14/061,294

(22) Filed: Oct. 23, 2013

(65) Prior Publication Data

US 2014/0119705 A1    May 1, 2014

(30) Foreign Application Priority Data

Oct. 26, 2012    (EP) .................................. 12190122

(51) Int. Cl.
*G02B 6/44*    (2006.01)

(52) U.S. Cl.
CPC ............ *G02B 6/4452* (2013.01); *G02B 6/4471* (2013.01); *G02B 6/4444* (2013.01)

(58) Field of Classification Search
CPC ... G02B 6/4444; G02B 6/4452; G02B 6/4471
USPC ................................................... 385/88, 135
See application file for complete search history.

(56) References Cited

U.S. PATENT DOCUMENTS

| | | | |
|---|---|---|---|
| 3,830,957 A | 8/1974 | Oberdiear | |
| 4,568,145 A | 2/1986 | Colin et al. | |
| 4,795,229 A * | 1/1989 | Abendschein et al. | ......... 385/87 |
| 5,012,042 A | 4/1991 | Summach | |
| 5,048,914 A | 9/1991 | Sneddon | |
| 5,064,268 A | 11/1991 | Morency et al. | |
| 5,067,783 A | 11/1991 | Lampert | |
| 5,082,454 A | 1/1992 | Tonkiss et al. | |
| 5,140,659 A | 8/1992 | Minds et al. | |
| 5,210,810 A | 5/1993 | Darden et al. | |
| 5,237,129 A | 8/1993 | Obara | |

(Continued)

FOREIGN PATENT DOCUMENTS

| | | |
|---|---|---|
| CH | 689434 AS | 4/1999 |
| EP | 0580130 A1 | 1/1994 |

(Continued)

OTHER PUBLICATIONS

International Search Report and Written Opinion for PCT/US2011/027813 mailed Jun. 24, 2011, 14 pages.

(Continued)

*Primary Examiner* — Akm Enayet Ullah

(57) ABSTRACT

A strain relief device having a first U-like shaped basic body having first and second opposite lateral walls connected to a second U-like shaped basic body having first and second opposite lateral walls by a film hinge integral with the first and second basic bodies. Wherein the second lateral wall of the second U-like shaped basic body has a recess, wherein the protrusion is insertable into the recess by a film hinge. The first and second basic bodies pivot with respect to each other to transfer the strain relief device between an opened installation state and a closed operation state. The first and second U-like shaped basic bodies releasably lock in the closed state and define in the closed operation state a feed-through channel for a cable to be strain relieved.

7 Claims, 2 Drawing Sheets

(56) References Cited

U.S. PATENT DOCUMENTS

| | | | |
|---|---|---|---|
| 5,461,688 A | 10/1995 | Lee | |
| 5,473,715 A | 12/1995 | Schofield et al. | |
| 5,542,015 A | 7/1996 | Hultermans | |
| 5,566,268 A | 10/1996 | Radliff et al. | |
| 5,715,348 A | 2/1998 | Falkenberg et al. | |
| 5,722,842 A | 3/1998 | Cairns | |
| 5,754,724 A | 5/1998 | Peterson et al. | |
| 5,881,191 A | 3/1999 | Liberty | |
| 5,949,946 A | 9/1999 | Debortoli et al. | |
| 6,021,246 A | 2/2000 | Koshiyama et al. | |
| 6,035,090 A | 3/2000 | Kawaguchi et al. | |
| 6,085,004 A * | 7/2000 | Dower et al. | 385/80 |
| 6,264,374 B1 | 7/2001 | Selfridge et al. | |
| 6,364,539 B1 | 4/2002 | Shahid | |
| 6,385,374 B2 | 5/2002 | Kropp | |
| 6,411,767 B1 * | 6/2002 | Burrous et al. | 385/135 |
| 6,483,980 B1 | 11/2002 | Wu et al. | |
| 6,533,465 B1 | 3/2003 | Lesesky et al. | |
| 6,736,545 B2 | 5/2004 | Cairns et al. | |
| 6,931,193 B2 | 8/2005 | Barnes et al. | |
| 6,952,530 B2 | 10/2005 | Helvajian et al. | |
| 6,974,262 B1 | 12/2005 | Rickenbach | |
| 7,074,066 B2 | 7/2006 | Pepe | |
| 7,097,486 B2 | 8/2006 | Parsons | |
| 7,118,284 B2 | 10/2006 | Nakajima et al. | |
| 7,220,065 B2 | 5/2007 | Han et al. | |
| 7,300,216 B2 | 11/2007 | Morse et al. | |
| 7,304,241 B2 | 12/2007 | Trieb et al. | |
| 7,708,469 B2 | 5/2010 | Liu et al. | |
| 7,738,759 B2 | 6/2010 | Parikh et al. | |
| 7,744,286 B2 | 6/2010 | Lu et al. | |
| 7,764,858 B2 | 7/2010 | Bayazit et al. | |
| 7,938,686 B2 | 5/2011 | Khemakhem et al. | |
| 7,942,587 B2 | 5/2011 | Barnes et al. | |
| 8,107,785 B2 | 1/2012 | Berglund et al. | |
| 8,164,044 B2 | 4/2012 | Mossman | |
| 8,208,780 B2 | 6/2012 | Hetzer et al. | 385/135 |
| 8,272,787 B2 | 9/2012 | Lu et al. | |
| 8,480,312 B2 | 7/2013 | Smith et al. | |
| 8,873,926 B2 | 10/2014 | Beamon et al. | |
| 2002/0159745 A1 | 10/2002 | Howell et al. | |
| 2003/0010519 A1 | 1/2003 | Pieck | |
| 2003/0103733 A1 | 6/2003 | Fleenor et al. | |
| 2003/0156798 A1 | 8/2003 | Cull | |
| 2005/0082467 A1 | 4/2005 | Mossman | |
| 2006/0133759 A1 | 6/2006 | Mullaney et al. | |
| 2006/0171639 A1 | 8/2006 | Dye | |
| 2007/0014522 A1 | 1/2007 | Yamaguchi et al. | |
| 2007/0263964 A1 | 11/2007 | Cody et al. | |
| 2008/0050070 A1 | 2/2008 | Gurreri et al. | |
| 2008/0166094 A1 | 7/2008 | Bookbinder et al. | |
| 2008/0175543 A1 | 7/2008 | Durrant et al. | |
| 2008/0258018 A1 | 10/2008 | Cox et al. | |
| 2009/0148104 A1 | 6/2009 | Lu et al. | |
| 2009/0162016 A1 | 6/2009 | Lu et al. | |
| 2009/0169163 A1 | 7/2009 | Abbott, III et al. | |
| 2009/0245743 A1 | 10/2009 | Cote et al. | |
| 2010/0027955 A1 | 2/2010 | Parikh et al. | |
| 2010/0040331 A1 | 2/2010 | Khemakhem et al. | |
| 2010/0079759 A1 | 4/2010 | Mossman | |
| 2010/0129039 A1 | 5/2010 | Smrha et al. | |
| 2010/0303431 A1 | 12/2010 | Cox et al. | |
| 2010/0329624 A1 | 12/2010 | Zhou et al. | |
| 2011/0123157 A1 | 5/2011 | Belsan et al. | |
| 2011/0188810 A1 | 8/2011 | Ciechomski et al. | |
| 2011/0200286 A1 | 8/2011 | Smith et al. | |
| 2011/0211326 A1 | 9/2011 | Drouard et al. | |
| 2011/0229083 A1 | 9/2011 | Dainese, Jr. et al. | |
| 2012/0039571 A1 | 2/2012 | Ciechomski et al. | |
| 2013/0028568 A1 | 1/2013 | Beamon et al. | |

FOREIGN PATENT DOCUMENTS

| | | |
|---|---|---|
| EP | 1199587 A1 | 4/2002 |
| FR | 2546308 A1 | 11/1984 |
| JP | 0772338 A | 3/1995 |
| WO | 0159501 A1 | 8/2001 |
| WO | 2004051338 A1 | 6/2004 |
| WO | 2005078493 A1 | 8/2005 |
| WO | 2006044080 A1 | 4/2006 |
| WO | 2006060250 A2 | 6/2006 |
| WO | 2006123214 A1 | 11/2006 |
| WO | 2008048935 A2 | 4/2008 |
| WO | 2008139218 A1 | 11/2008 |
| WO | 2009018439 A1 | 2/2009 |
| WO | 2011088613 A1 | 7/2011 |
| WO | 2012074684 A2 | 6/2012 |

OTHER PUBLICATIONS

Final Office Action for U.S. Appl. No. 13/014,229 mailed May 22, 2014, 13 pages.
Advisory Action for U.S. Appl. No. 13/014,229 mailed Jul. 10, 2014, 4 pages.
Non-final Office Action for U.S. Appl. No. 13/014,229 mailed Sep. 23, 2013, 12 pages.
Applicant-Initiated Interview Summary for U.S. Appl. No. 13/014,229 mailed Jan. 31, 2014, 3 pages.
Non-final Office Action for U.S. Appl. No. 13/603,928 mailed Apr. 18, 2013, 11 pages.
Notice of Allowance for U.S. Appl. No. 13/603,928 mailed Sep. 23, 2013, 7 pages.
Notice of Allowance for U.S. Appl. No.13/603,928 mailed Jan. 15, 2014, 7 pages.
Notice of Allowance for U.S. Appl. No. 13/603,928 mailed Apr. 21, 2014, 7 pages.
Non-final Office Action for U.S. Appl. No. 13/741,529 mailed Jan. 27, 2014, 11 pages.
Notice of Allowance for U.S. Appl. No. 13/741,529 mailed May 14, 2014, 8 pages.
International Search Report for PCT/US2012/027367 mailed Sep. 11, 2012, 6 pages.
International Preliminary Report on Patentability for PCT/US2012/027367 mailed Sep. 19, 2013, 10 pages.
Non-Final Office Action for U.S. Appl. No. 13/014,229 mailed Dec. 5, 2014, 12 pages.
Non-final Office Action for U.S. Appl. No. 13/302,067 mailed Jun. 7, 2013, 13 pages.
Final Office Action for U.S. Appl. No. 13/302,067 mailed Oct. 11, 2013, 11 pages.
Notice of Allowance for U.S. Appl. No. 13/302,067 mailed Jul. 25, 2014, 7 pages.
Non-final Office Action for U.S. Appl. No. 13/302,067 mailed Oct. 16, 2014, 7 pages.
Advisory Action for U.S. Appl. No. 13/302,067 mailed Dec. 27, 2013, 3 pages.
Applicant-Initiated Interview Summary for U.S. Appl. No. 13/302,067 mailed Jan. 15, 2014, 3 pages.
Final Office Action for U.S. Appl. No. 13/302,067 mailed Jan. 27, 2014, 7 pages.
Advisory Action for U.S. Appl. No. 13/302,067 mailed Apr. 7, 2014, 3 pages.
Notice of Allowance for U.S. Appl. No. 13/302,067 mailed Feb. 11, 2015, 7 pages.
Extended European Search Report for European Patent Application 12190122.7 mailed Apr. 11, 2013, 8 pages.
Non-Final Office Action for U.S. Appl. No. 13/552,900 mailed Dec. 5, 2014, 29 pages.

* cited by examiner

STRAIN RELIEF DEVICE FOR CABLES AND FIBER OPTIC DISTRIBUTION DEVICE

PRIORITY CLAIM

This application claims the benefit of priority under 35 U.S.C §119 of European Patent Application No. 12190122.7 filed Oct. 26, 2012, the content of which is relied upon and incorporated herein by reference it its entirety.

BACKGROUND

1. Field

The present patent application relates to a strain relief device for cables. The present patent application relates further to a fiber optic distribution device.

2. Technical Background

When building data transmission networks from optical cables, it is necessary to interconnect optical fibers of the cables and to store excess lengths of said optical fibers. The connection points and excess lengths must be handled in fiber optic distribution devices outside of buildings and inside of buildings.

Outside of buildings for so-called outdoor applications, connection points between optical fibers and excess lengths thereof, are typically accommodated in fiber optic distribution devices designed as cable sleeves or street cabinets. Inside of buildings for so-called indoor applications, connection points between optical fibers and excess lengths thereof, are typically accommodated in fiber optic distribution devices designed as distribution cabinets or distribution frames. Fiber optic distribution devices designed as wall boxes can be used both outside of buildings and inside of buildings.

Fiber optic fiber distribution devices designed as wall boxes are known from the product catalogue entitled "Accessories for fiber optic networks, Edition 1, pages 184 to 187, issue 2001, Corning Cable Systems GmbH & Co. KG". The wall boxes disclosed in this product catalogue comprise a housing and optical fiber handling components, specifically splice cassettes and/or patch panels and/or strain relief devices, positioned inside the housing for handling connection points and excess lengths of optical fibers and for providing strain relief for the optical cables.

One of the key issues within fiber optic distribution devices is strain relieving of the optical cables entering the fiber optic distribution device.

Usually the strengthening elements of cables like aramid fibers are fixed by a simple clamp with a screw, however such a solution requires a lot of time for installation and a proper tool. Further on, such a solution requires a significant amount of flat surface and can therefore not provide a high density strain relief solution.

Another way to strain relieve cables is to use a standard cable tie. Using such cable ties is cost effective but not reliable.

U.S. Pat. No. 8,208,780 B2 discloses a strain relief device making use of a screw like element. This strain relief device requires a significant amount of flat surface and a proper tool. The strain relief device of U.S. Pat. No. 8,208,780 B2 does not provide a high density strain relief solution and does not provide a quick and easy operation.

SUMMARY

The present application is based on addressing the problem of providing a novel strain relief device for cables for use in fiber optic distribution devices providing a high density strain relief solution and, at the same time, allowing a quick and easy operation as well as providing a novel fiber optic distribution device.

The strain relief device according to the present patent application comprises a first U-like shaped basic body having two opposite lateral walls and a middle wall running between the two lateral walls and a second U-like shaped basic body having two opposite lateral walls and a middle wall running between the two lateral walls.

The two U-like shaped basic bodies are joined to each other by a film hinge being an integral element of the two basic bodies, wherein the film hinge is provided between a first lateral wall of the first U-like shaped basic body and a first lateral wall of the second U-like shaped basic body allowing the two basic bodies to pivot with respect to each other in order to transfer the strain relief device between an opened installation state and a closed operation state, and wherein the two U-like shaped basic bodies define in the closed operation state a feed-through channel for a cable to be strain relieved.

A second lateral wall of the first U-like shaped basic body comprises a protrusion and a second lateral wall of the second U-like shaped basic body comprises a recess, wherein in the closed operation state of the strain relief device the protrusion of the first U-like shaped basic body inserts into the recess of the second U-like shaped basic body thereby retaining the strain relief device in the closed operation state and thereby clamping strengthening elements being wrapped around the protrusion between the protrusion and the recess in the closed operation state of the strain relief device.

The novel strain relief device allows a quick and easy operation. The novel strain relief device allows an installation and handling of cables outside the fiber optic distribution device. No additional tools are needed for installation. The novel strain relief device is a separate component and can therefore be used for different applications. The novel strain relief device provides a high density strain relief solution.

The fiber optic distribution device comprises a housing and optical fiber handling components, specifically splice cassettes and/or patch panels and/or strain relief devices, positioned inside the housing for handling connection points and excess lengths of optical fibers, and a plurality of strain relief devices according to the present application, wherein the strain relief devices are accommodated in a bracket in a stacked manner.

BRIEF DESCRIPTION OF THE DRAWINGS

Preferred embodiments of the strain relief device are given in the dependent claims and the description below. Exemplary embodiments will be explained in more detail with reference to the drawing, in which:

DETAILED DESCRIPTION

Figure 1:
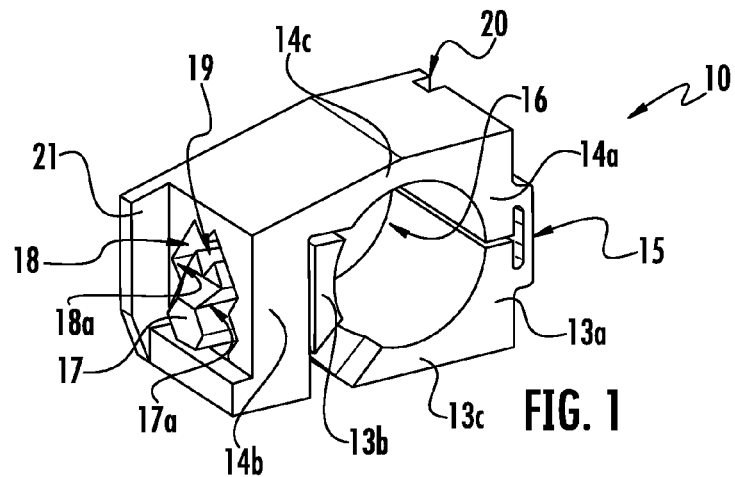
FIG. 1 shows a perspective view of a strain relief device for cables in a closed operation state of the same.
Figure 2:
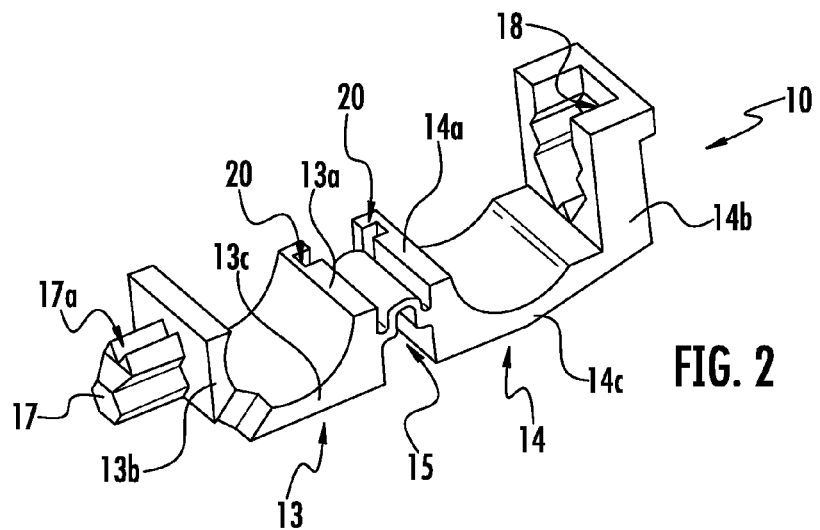
FIG. 2 shows a perspective view of the strain relief device of FIG. 1 in an opened installation state of the same.
Figure 3:
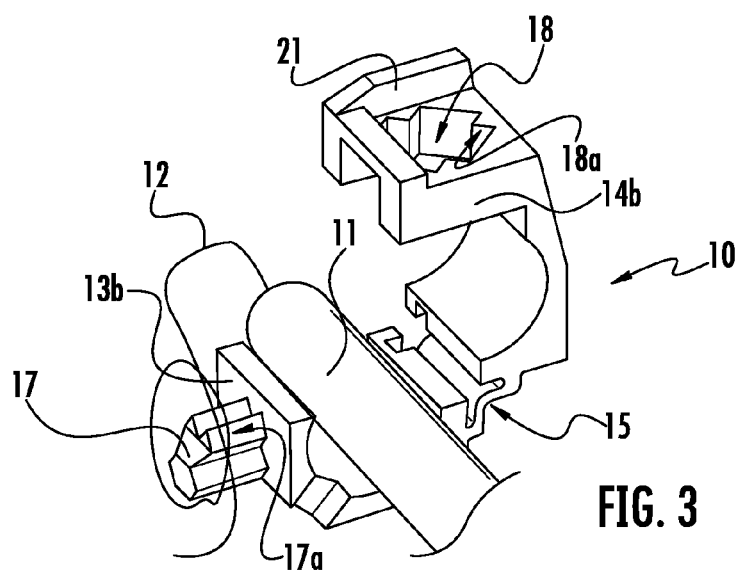
FIG. 3 shows a perspective view of the strain relief device of FIG. 1 in an opened installation state of the same together with strengthening members of a cable to be strain relieved.

The present patent application relates to a strain relief device 10 for cables. FIG. 1 shows the strain relief device 10 in a closed operation state. FIGS. 2 and 3 show the strain relief device 10 in an opened installation state, whereby FIG. 3 shows in a addition a cable 11 having strengthening elements 12.

The strain relief device 10 comprises a first U-like shaped basic body 13 having two opposite lateral walls 13a, 13b and a middle wall 13c running between the two lateral walls 13a and 13b. The strain relief device 10 further comprises a second U-like shaped basic body 14 having two opposite lateral walls 14a, 14b and a middle wall 14c running between the two lateral walls 14a and 14b.

The two U-like shaped basic bodies 13 and 14 are joined to each other by a film hinge 15 being an integral element of the two basic bodies 13 and 14. The U-like shaped basic bodies 13 and 14 and the film hinge 15 are sections of a monolithic strain relief device 10 manufactured by injection moulding.

The film hinge 15 is provided between a first lateral wall 13a of the first U-like shaped basic body 13 and a first lateral wall 14a of the second U-like shaped basic body 14 allowing the two basic bodies 13, 14 to pivot with respect to each other in order to transfer the strain relief device 10 between an opened installation state (see FIGS. 2 and 3) and a closed operation state (see FIG. 1). The two U-like shaped basic bodies 13, 14 define in the closed operation state a feed-through channel 16 for the cable 11 to be strain relieved.

A second lateral wall 13b of the first U-like shaped basic body 13 comprises a protrusion 17 and a second lateral 14b wall of the second U-like shaped basic body 14 comprises a recess 18. In the closed operation state of the strain relief device 10 (see FIG. 1) the protrusion 17 of the first U-like shaped basic body 13 inserts into the recess 18 of the second U-like shaped basic body 14 thereby retaining the strain relief device 10 in the closed operation state.

In the closed operation state of the strain relief device 10 the protrusion 17 and the recess 18 clamp the strengthening elements 12 being wrapped around the protrusion 17 between the protrusion 17 and the recess 18. FIG. 3 shows a strengthening element 12 of the cable 11 to be strain relieved wrapped around the protrusion 17 of the first U-like shaped basic body 13.

The protrusion 17 of the first U-like shaped basic body 13 comprises a serrated outer surface 17a. The recess 18 of the second U-like shaped basic body 14 comprises a serrated inner surface 18a. The serrated surfaces 17a, 18a provide a very effective clamping of the strengthening elements 11 and thereby a very effective strain relief for the cable 11.

The serrated surfaces 17a, 18a define in the closed operation state of the strain relief device 10 a gap 19. The gap 19 is dimensioned in such a way that the same can receive and clamp a bundle strengthening elements 11 of the cable 10 to be strain relieved between the protrusion 17 and the recess 18 in the closed operation state of the strain relief device 10.

The first lateral wall 13a of the first U-like shaped basic body 13 and the first lateral wall 14a of the second U-like shaped basic body 14 comprise each a groove 20. In the closed operation state of the strain relief device 10 the grooves 20 of the two U-like shaped basic bodies 13, 14 align with each other thereby defining a common groove. The second lateral wall 14b of the second U-like shaped basic body 14 comprises a projection 21. The projection 21 and the grooves 20 serve as guide elements for positioning the strain relief device 10 in a bracket of a fiber optic distribution device.

Figure 4:
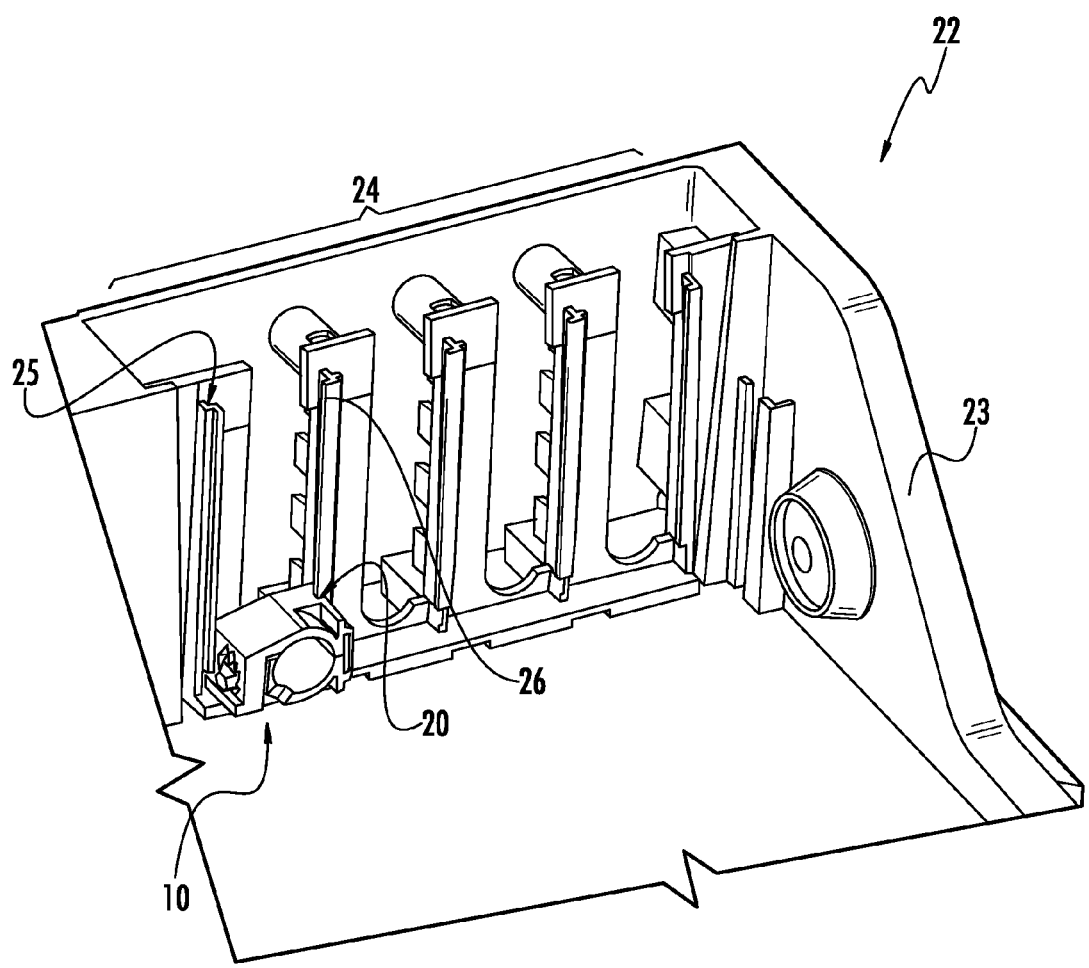
FIG. 4 shows a detail of a fiber optic distribution device comprising a bracket for receiving a plurality of strain relief devices as shown in FIGS. 1 to 3.

FIG. 4 shows a detail of a fiber optic distribution device 22 comprising a housing 23 and optical fiber handling components, specifically splice cassettes (not shown) and/or patch panels (not shown) and/or strain relief devices 10, positioned inside the housing 23 for handling connection points and excess lengths of optical fibers.

The fiber optic distribution device 22 comprises a bracket 24 for receiving a plurality of strain relief devices 10 in a stacked manner. In the shown embodiment the bracket 24 can accommodate the strain relief devices 10 in an array-like manner comprising several columns of stacked strain relief devices 10. The shown bracket 24 is designed to accommodate four columns of strain relief devices 10, each column comprising four stacked strain relief devices 10. Al-though any number of columns may be accommodated.

A strain relief device 10 can be stacked within the bracket 24 of the fiber optic distribution device 22 using the projection 21 and the grooves 20 serving as guide elements in such a way that the projection 21 of the respective strain relief device 10 is received by a groove 25 of the bracket 24 and that the groove 20 of the strain relief device 10 receives a projection 26 of the bracket 24. This kind of stacking is simple and reliable.

What is claimed is:

1. Strain relief device for cables having strengthening elements, comprising:
    a first U-like shaped basic body having first and second opposite lateral walls and a middle wall running between the first and second lateral walls, wherein the second lateral wall of the first U-like shaped basic body has a protrusion;
    a second U-like shaped basic body having first and second opposite lateral walls and a middle wall running between the first and second lateral walls wherein the second lateral wall of the second U-like shaped basic body has a recess, wherein the protrusion is insertable into the recess; and
    a film hinge integral with the first and second basic bodies, wherein the first and second U-like shaped basic bodies are joined to each other by the film hinge, and wherein the film hinge is between the first lateral wall of the first U-like shaped basic body and the first lateral wall of the second U-like shaped basic body allowing the two basic bodies to pivot with respect to each other in order to transfer the strain relief device between an opened installation state and a closed operation state, and wherein the two U-like shaped basic bodies define in the closed operation state a feed-through channel for a cable to be strain relieved;
    wherein in the closed operation state of the strain relief device the protrusion of the first U-like shaped basic body inserts into the recess of the second U-like shaped basic body thereby retaining the strain relief device in the closed operation state and wherein the protrusion and the recess are configured to clamp a strengthening elements of the cable to be strain relieved.

2. Strain relief device of claim 1, wherein the protrusion comprises a serrated outer surface and the recess comprises a serrated inner surface.

3. Strain relief device of claim 2, further comprising a gap formed between the serrated outer surface of the protrusion and the serrated inner surface of the recess allowing clamping of the strengthening elements of the cable between the protrusion and the recess in the closed operation state of the strain relief device.

4. Strain relief device of claim 1, wherein the first lateral wall of the first U-like shaped basic body and the first lateral wall of the second U-like shaped basic body provide a groove, and that the second lateral wall of the second U-like shaped basic body comprises a projection, both providing guide elements for positioning the strain relief device in a bracket of a fiber optic distribution device.

5. Fiber optic distribution device, comprising:
a housing; and
optical fiber handling components positioned inside the housing for handling connection points and excess lengths of optical fibers, wherein the optical fiber handling components comprise a plurality of strain relief devices accommodated in a bracket in a stacked manner, wherein each of the plurality of strain relief devices comprise,
a first U-like shaped basic body having first and second opposite lateral walls and a middle wall running between the first and second lateral walls, wherein the second lateral wall of the first U-like shaped basic body has a protrusion;
a second U-like shaped basic body having first and second opposite lateral walls and a middle wall running between the first and second lateral walls wherein the second lateral wall of the second U-like shaped basic body has a recess, wherein the protrusion is insertable into the recess; and
a film hinge integral with the first and second basic bodies, wherein the first and second U-like shaped basic bodies are joined to each other by the film hinge, and wherein the film hinge is between the first lateral wall of the first U-like shaped basic body and the first lateral wall of the second U-like shaped basic body allowing the two basic bodies to pivot with respect to each other in order to transfer the strain relief device between an opened installation state and a closed operation state, and wherein the two U-like shaped basic bodies define in the closed operation state a feed-through channel for a cable to be strain relieved;
wherein in the closed operation state of the strain relief device the protrusion of the first U-like shaped basic body inserts into the recess of the second U-like shaped basic body thereby retaining the strain relief device in the closed operation state and wherein the protrusion and the recess are configured to clamp a strengthening elements of the cable to be strain relieved, and wherein the plurality of strain relief devices are accommodated in a bracket in a stacked manner.

6. Fiber optic distribution device of claim 5, wherein a groove of the bracket receives a projection of the strain relief devices, and wherein the groove of the strain relief devices receive a projection of the bracket.

7. Fiber optic distribution device of any of claim 6, wherein the strain relief devices are accommodated in the bracket in an array-like manner comprising several columns of stacked strain relief devices.

* * * * *